United States Patent
Tsune

[19]

[11] Patent Number: 5,823,081
[45] Date of Patent: Oct. 20, 1998

[54] CIRCULAR SAW

[75] Inventor: Ryoichi Tsune, Toyama, Japan

[73] Assignee: Tsune Seiki Co., Ltd., Japan

[21] Appl. No.: 658,478

[22] Filed: Jun. 5, 1996

[30] Foreign Application Priority Data

| Jun. 30, 1995 | [JP] | Japan | 7-164968 |
| Sep. 22, 1995 | [JP] | Japan | 7-244855 |
| Sep. 22, 1995 | [JP] | Japan | 7-244859 |

[51] Int. Cl.⁶ .................................................. B26D 7/06
[52] U.S. Cl. ................... 83/151; 83/107; 83/113; 83/175; 83/176
[58] Field of Search .................. 83/107, 113, 118, 83/151, 175, 176, 390, 452, 461, 466

[56] References Cited

U.S. PATENT DOCUMENTS

| 3,572,200 | 3/1971 | Allison et al. ................... 83/113 |
| 3,648,552 | 3/1972 | Bradley ........................... 83/390 |
| 3,709,075 | 1/1973 | Goeliner ........................... 83/113 |
| 3,752,023 | 8/1973 | Allison et al. ................... 83/113 |
| 4,143,567 | 3/1979 | Kaiser et al. ..................... 83/107 |
| 4,289,054 | 9/1981 | Pieper et al. ..................... 83/113 |
| 4,378,715 | 4/1983 | Kaiser et al. ..................... 83/107 |
| 4,445,410 | 5/1984 | Lazar, Jr. et al. ................. 83/390 |
| 4,829,865 | 5/1989 | Nunnery et al. ................... 83/461 |
| 5,156,077 | 10/1992 | Stursberg ......................... 83/452 |

Primary Examiner—M. Rachuba
Attorney, Agent, or Firm—Schweitzer Cornman Gross & Bondell, LLP

[57] ABSTRACT

A circular saw with a spreading mechanism employing hydraulic cylinders for opening and closing a main vise about a workpiece to be crosscut by a saw blade, and a carrier vise for spreading and for advancing the workpiece for crosscutting, the tightening and loosening of the main vise about the workpiece, and the spreading by the carrier vise is controlled by a hydraulic sequencing circuit resulting in lower manufacturing cost of the saw.

6 Claims, 10 Drawing Sheets

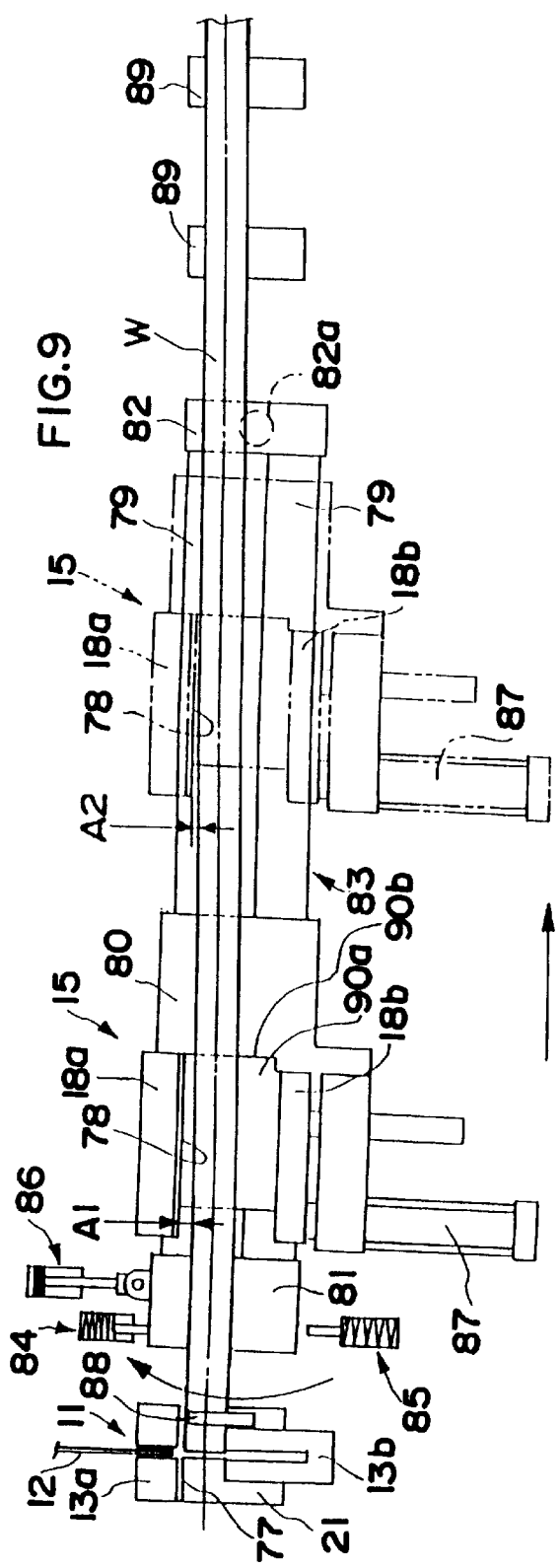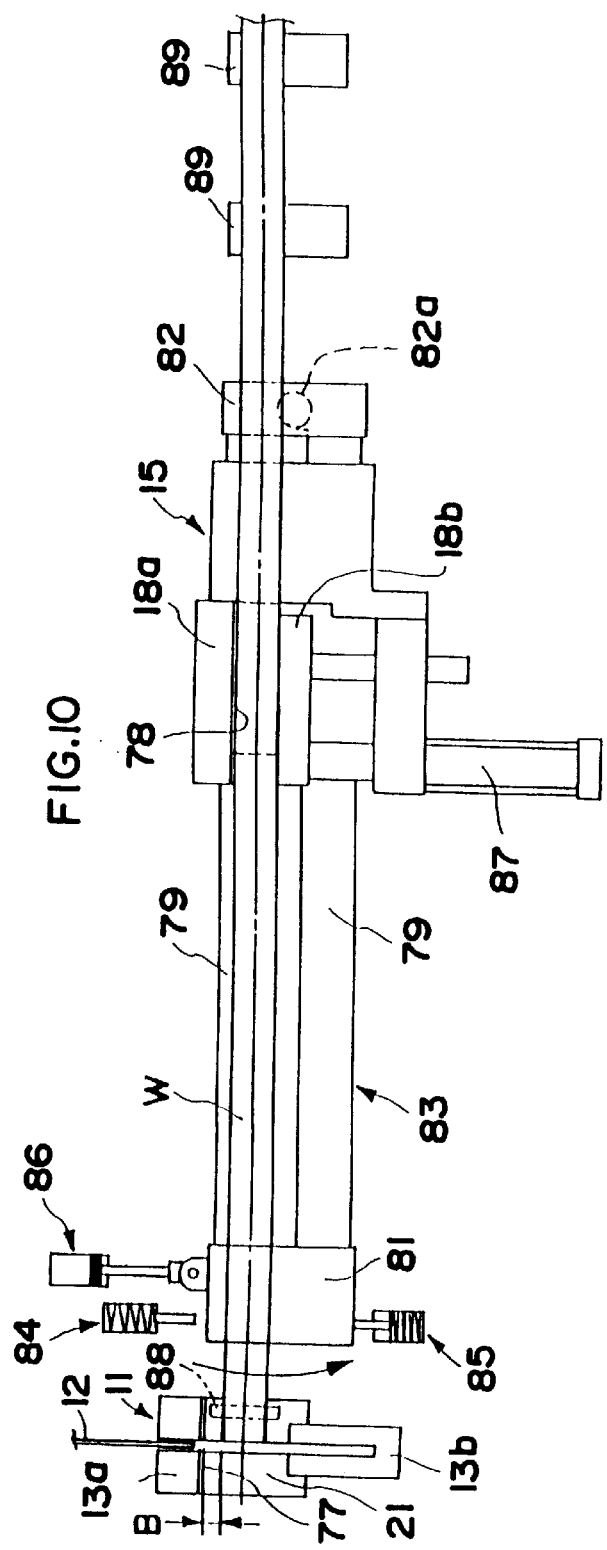

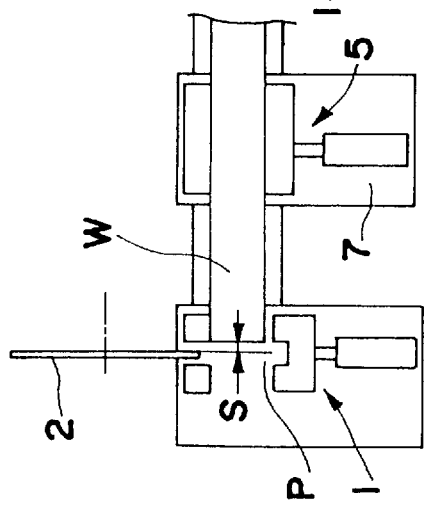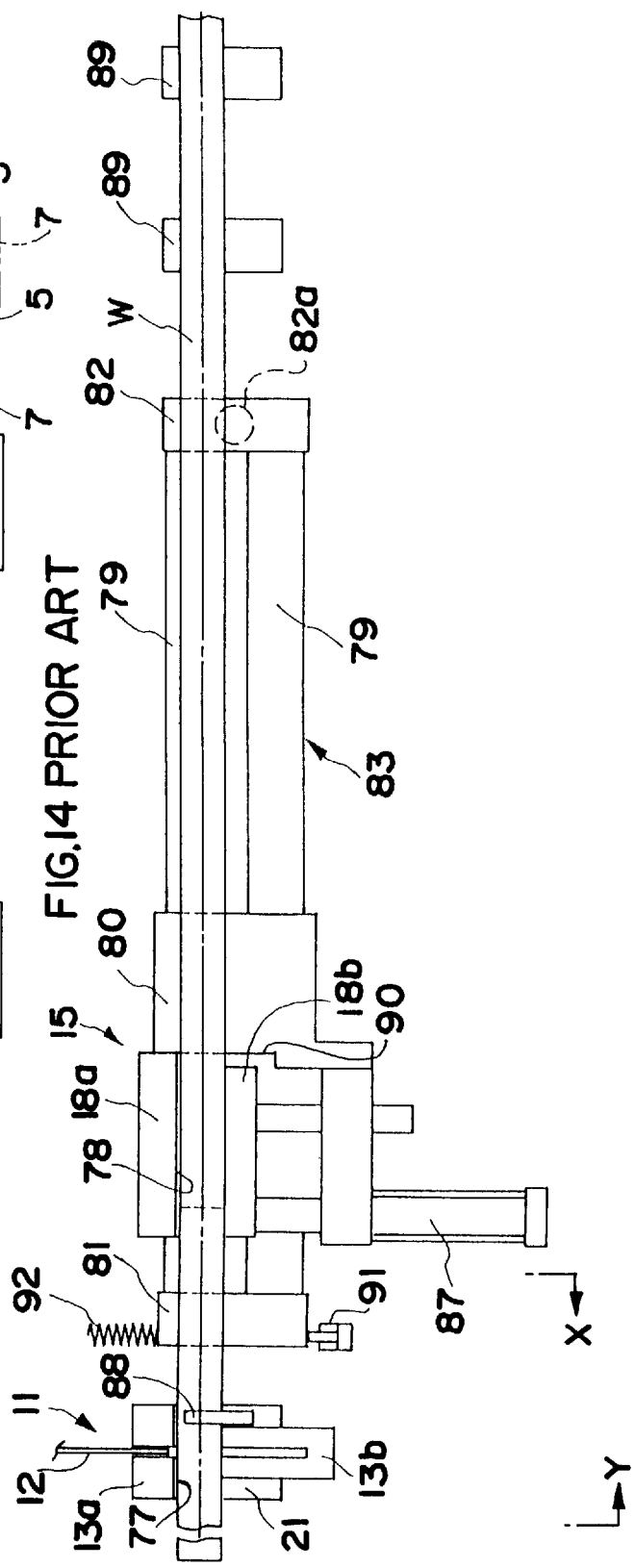

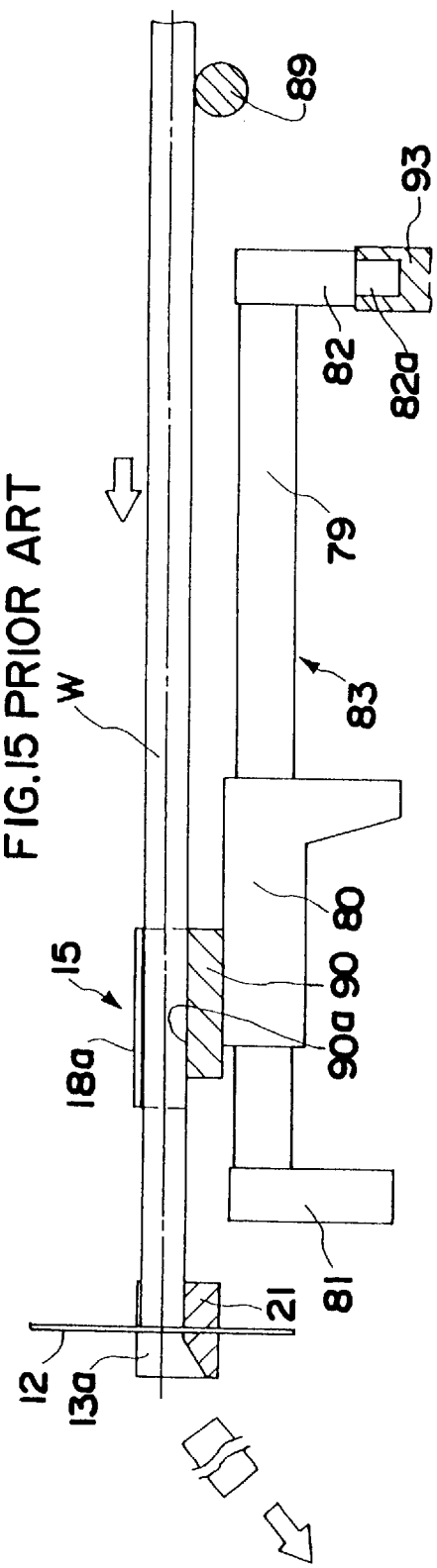
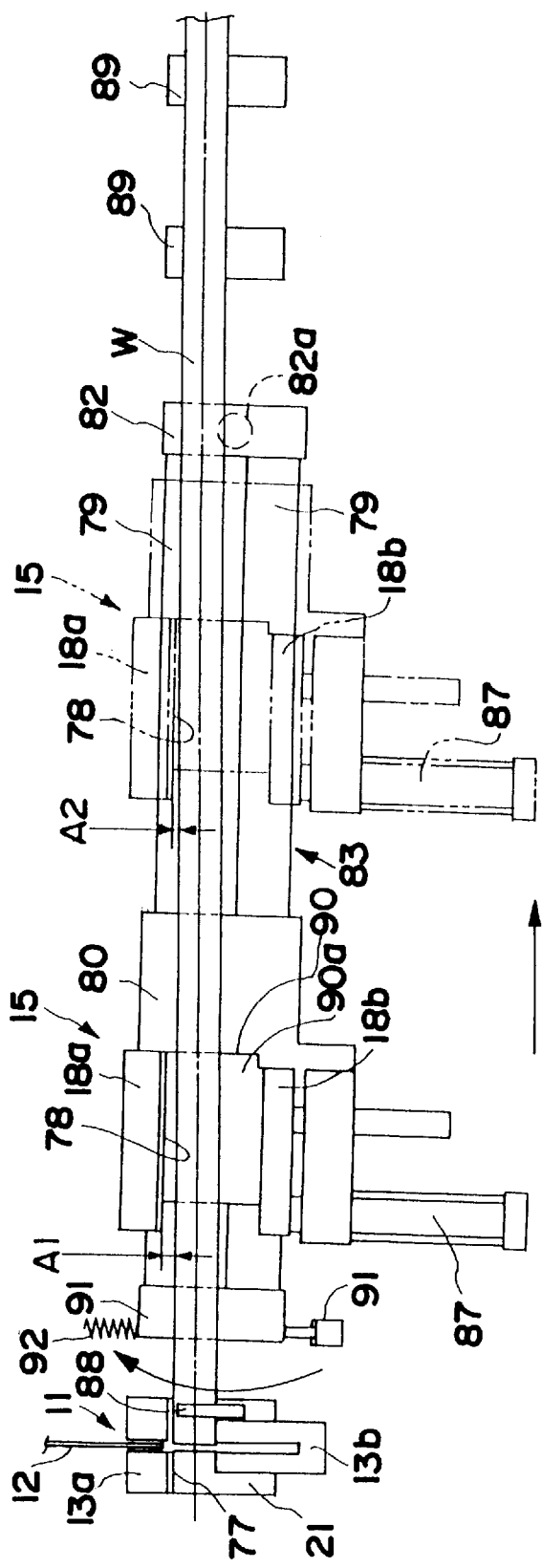

CIRCULAR SAW

FIELD OF THE INVENTION

The present invention relates to a circular saw which has a main vise for holding the workstock to be cut, a circular saw blade, and a carrier vise adapted to hold the workstock and to advance it for cutting.

BACKGROUND OF THE INVENTION

Circular saws normally have a spreading or gap-forming mechanism for creating a gap between a cut end face of the workstock and the adjacent face of a saw blade. The carrier vise, which reciprocates between a normal forward and a normal rear position by a distance corresponding to the predetermined cutoff length of the workstock. The vise holds the remaining workstock at the normal rear position after an earlier advanced part of the workstock has been cut off. Then the main vise is loosened to release the held work-stock, and is then further moved backward by a predetermined spreading distance.

Referring to FIG. 11 which is a schematic illustration of prior art circular saws that have a spreading mechanism, a main vise for holding a workstock W is disposed in front of and behind the crosswise cutting path of a circular saw blade 2. The spreading mechanism has a fixed vise jaw 3a, a movable vise jaw 3b and a hydraulic cylinder 4 for moving the movable vise jaw 3b relative to the fixed vise jaw 3a. A carrier vise 5 is adapted to hold the workstock W and to forward it partially over the cutting path of the circular saw 2. The carrier vise is disposed on a platform 7 driven by a ball-screw mechanism (not shown) along a guide rail (not shown) provided on a bench 6. The carrier vise 5 has a fixed vise jaw 8a, a movable vise jaw 8b and a hydraulic cylinder 9 for moving the movable vise jaw 8b relative to the fixed vise jaw 8a. The circular saw blade 2 is mounted on a saw frame 10 and is adapted to advance toward and recede from a cutting position P.

FIGS. 12 and 13 show the cutting and spreading operations of the prior art saw of the workstock W. As shown in FIG. 12(A) and (B), first the circular saw blade 2 advances along the cutting path through the workstock W and thereby cuts off an advanced part of predetermined length L thereof. The carrier vise 5 is loosened during the cutting and then is withdrawn to a rear position by the next cut off length L of the workstock W. The carrier vise is tightened here for holding the remaining workstock W and is in a standby state. FIG. 12(B) shows a state in which a forwarded part of the workstock W has been cut off and the carrier vise 5 is standing by at the normal rear position by the next cutoff length L of the workstock W. As shown in FIG. 12(C), next the main vise 1 is loosened, and the cut off part w of the workstock W is removed, the carrier vise 5 which holds the workstock W at the normal rear position and is further withdrawn by the platform 7 slightly rearwardly by a spreading distance to a spreading-associated position to form a gap S between a cut end face of the workstock W and a side of the circular saw 2 as shown in FIG. 12(D).

As shown in FIG. 13(A), next the circular saw 2 is withdrawn from the cutting position P, and as shown in FIG. 13(B), the carrier vise 5 is moved forward by the total length (S+L), i.e. the gap S plus the cutoff length L of the workstock W, in preparation for the next saw cut. Then the same operations shown in FIG. 12(A) through (D) and FIG. 13(A) and (B) are repeated.

A gap is most suitably formed when a circular saw blade 2 is used for cutting, having saw teeth with super-hard tips such as cemented-on carbide tips. That is accomplished by immediately after finishing a cut through the workstock W, by the aforementioned spreading operation between the face of the saw blade and the cut face of the workstock next to the saw, by slightly withdrawing the workstock W slightly while the main vise 1 is loose, so that the side of the circular saw blade 2 is prevented from sliding in contact with the cut face of the workstock W when the saw is withdrawn to a standby position from the cutting position P. Therefore, the cemented carbide tips on the saw teeth will not wear or be damaged, and the useful life of the saw is extended, and any deterioration of cutting accuracy due to sliding on the cut face of the workstock can be prevented.

The conveying mechanism of the spreading unit of known circular saws for moving the carrier vise 5 usually includes either a ball-screw mechanism comprised of ball screws and a servomotor for driving the same, or a rack and pinion mechanism comprised of a rack, a pinion and a servomotor for driving the same, to conduct the spreading by electrically controlling the servomotor and by electrically controlling a tightening and loosening operating means, such as the hydraulic cylinder 4 of the main vise 1. This has the drawback that the electrical control is rather complicated and its production costs are very high.

BRIEF DESCRIPTION OF THE INVENTION

It is an object of the present invention to overcome the above-mentioned drawbacks of the prior art circular saws having a spreading mechanism which, in place of the conventional electrical control system, uses a hydraulic cylinder as the tightening and loosening means for the main vise and the conveyor for the carrier vise, and arranging it so that the loosening of the main vise and the spreading withdrawal of the carrier vise are carried out with a hydraulic sequence circuit to enable a lowering of the production cost of the apparatus.

Accordingly, the present invention provides a circular saw having a circular saw blade for crosscutting a workstock a main vise for holding the workstock before and behind the crosscutting path of the circular saw blade, a carrier vise for holding the workstock and advancing it partially over the saw blade path, a spreading mechanism for forming a gap between a cut end face of the workstock and the adjacent side of the saw blade by further withdrawing the carrier vise holding the workstock rearwardly by a predetermined spreading distance. The carrier vise is then returned to its forward position to place a predetermined part of the workstock in the cutting path where it is held by the main vise while the remaining workstock is held by the carrier vise at its normal rear position. After the advanced part of the workstock has been cut off, the main vise is loosened for releasing the cut off part. The main vise has a operating hydraulic cylinder for tightening and loosening the main vise jaws, and the carrier vise has a operating hydraulic cylinder for tightening and loosening the carrier vise jaw, and a hydraulic cylinder is provided for conveying the carrier vise between its front and its normal rear positions, and a spreading mechanism is provided, having a swing lever swingably pivoted to a fixed position, a stopper on a front face of the swing lever at an interior first end thereof relative to a swinging fulcrum to restrict the carrier vise to the normal rear position, a spring for supporting the front face of the swing lever on a second interior end thereof to keep the stopper at a predetermined restricting position, and a spreading hydraulic cylinder for swinging and displacing the stopper further rearwardly in the returning direction of the carrier vise by pushing the exterior end of the swing lever against the bias of the spring, the spreading mechanism having a first pipe connected between a main vise loosening side chamber of the main vise operating hydraulic cylinder, and a lever pushing side chamber of the spreading hydraulic cylinder, a second pipe branched from the first pipe, a third pipe connected to the main vise closing side chamber of the operating hydraulic cylinder of the main vise, and the second and third pipes being selectively connected to a source of oil pressure and a tank through a switch valve between the second and third pipes.

DESCRIPTION OF THE DRAWING

Other objects of the present invention will become apparent from the following detailed description of the embodiments, with reference being had to the drawing, wherein.

FIG. 9 is the same view as in FIG. 8, with the guide frame in a first displacement position;

FIG. 10 is the same view as in FIG. 8, with the guide frame in a second displacement position;

FIGS. 13(A)–(B) are explanatory views for the cutting and spreading operations of the prior art circular saws that are carried out after the operations shown in FIG. 12;

FIG. 14 is a plan view of prior art circular saws;

FIG. 15 is a side view of the prior art circular saw of FIG. 14;

FIG. 16 is a plan view of the prior art saw of FIG. 14;

DETAILED DESCRIPTION

Figure 1:
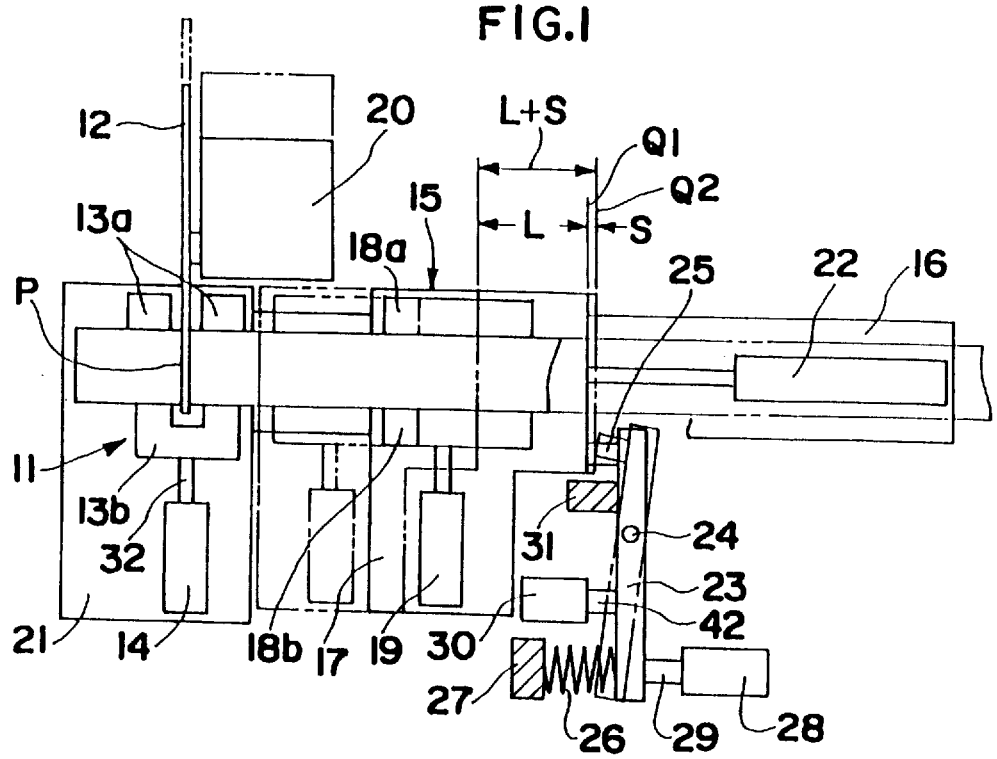
FIG. 1 is a plan view of one embodiment of a circular saw of the present invention.
Figure 2:
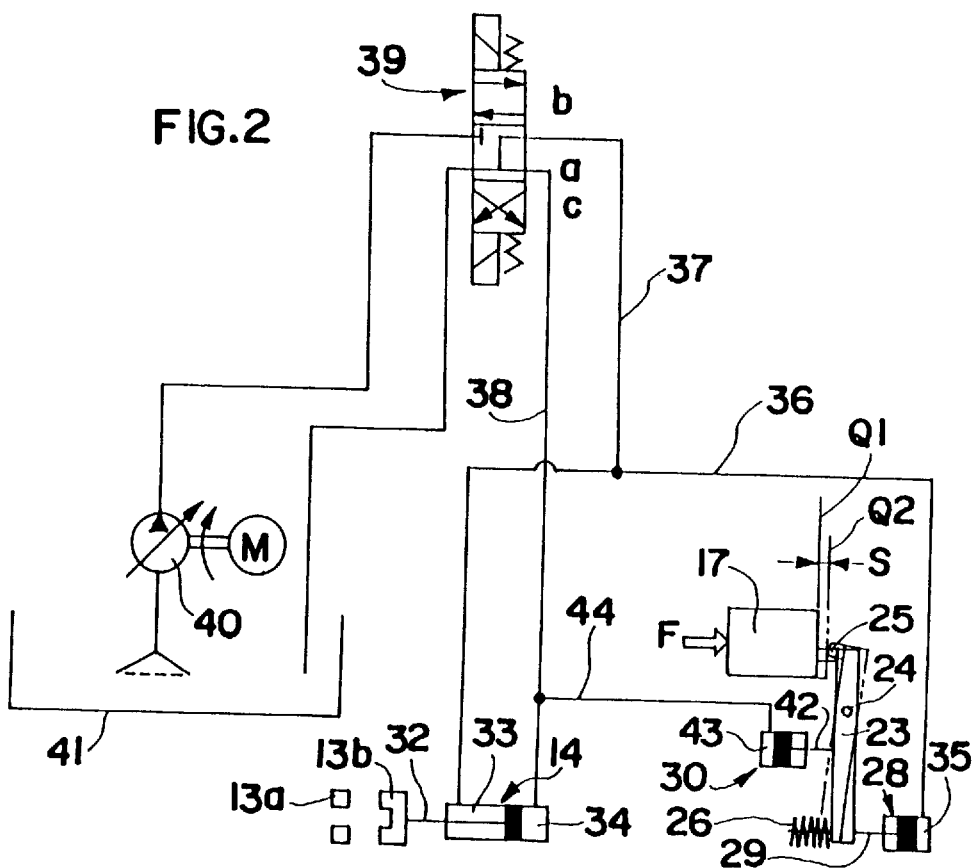
FIG. 2 is a hydraulic circuit diagram of a spreading mechanism provided in the circular saw of FIG. 1.

FIGS. 1 and 2 show a first embodiment of a saw having the spreading mechanism of the present invention. A main vise 11 is provided for holding workstock W before and after the crosswise cutting path of a circular saw blade 12, disposed on a base 21. The main vise 11 has a fixed vise jaw 13a, a movable vise jaw 13b, and an operating cylinder 14 of the main vise for moving the movable vise jaw 13b relative to the fixed vise jaw 13a. A carrier vise 15 is adapted to hold the workstock W and to forward it over the cutting path of the circular saw blade. The vise 15 has a fixed vise jaw 18a, a movable vise jaw 18b, and an vise operating hydraulic cylinder 19 for moving the movable vise jaw 18b relative to the fixed vise jaw 18a. The cylinder 19 is attached to a platform 17 that is moved by a conveying hydraulic cylinder 22 along a guide rail (not shown) on a bench 16. The circular saw blade 12 is mounted on a saw frame 20 and is adapted to advance along the cutting path toward and recede from a cutting position P.

A swing lever 23 is pivoted at a fixed position in the saw by a pivot fulcrum 24. The interior end of the swing lever 23 toward the bench 16 has a stopper 25 for restricting the carrier vise 15 to a normal rear position Q1. The stopper 25 is attached to the front face of the interior end of the swing lever 23. The normal rear position Q1 of the carrier vise 15 is represented by a rear end face of the returned platform 17, as shown by a solid line in the FIG. 1. A spring 26 supports a front face of the exterior end of the swing lever 23 to keep the stopper 25 at a predetermined restricting position where the stopper 25 contacts a rear end face of the platform 17 at the normal rear position of the carrier vise 15. The spring 26 is secured to a spring support 27, and has a biasing force that can support the exterior end of the swing lever 23 so that, when the carrier vise 15 is returned by the conveying hydraulic cylinder 22, the moment generated on the rear of the swing lever 23 by the spring 26 is relatively larger than the moment generated on the front of the lever first shown in FIG. 1 by a pressing force F applied to the stopper 25 touching the rear end of the platform 17.

A spreading hydraulic cylinder 28 is disposed at the rear of the exterior end of the swing lever 23, in line with the spring 26 on its front exterior end. The spreading hydraulic cylinder 28 carries out the spreading operation by pushing the rear exterior end of the swing lever 23 against the bias of the spring 26, and thereby swings and displaces the stopper 25 further rearward in the direction from where the carrier vise 15 returns as shown by a broken line. A piston rod 29 of the cylinder 28 is arranged to contact the rear exterior face of the swing lever 23. A spring-assisting hydraulic cylinder 30 supports the exterior end of the swing lever 23 to retain the stopper 25 at the predetermined restricting position shown by a solid line, in cooperation with the spring 26, when the spreading hydraulic cylinder 28 is inactive. The forward position of the swing lever 23 is restricted by a restricting member 31 so that the stopper 25 on the lever will not swing forward beyond the normal rear position Q1 of the carrier vise 15.

FIG. 2 shows a hydraulic control circuit of the spreading mechanism, the main vise operating hydraulic cylinder 14 has its piston rod 32 interconnected with the movable vise jaw 13b, whereby, when pressure oil is supplied to a rod accommodating vise loosening chamber 33, the movable vise jaw 13b retracts from the fixed vise jaw 13a to loosen the main vise and when pressure oil is supplied to a main vise tightening chamber 34, the movable vise jaw 13b moves toward the fixed vise jaw 13a to tighten the main vise. On the other hand, the pressure oil is supplied in the spreading hydraulic cylinder 28 only to a pushing assisting chamber 35 for the spreading operation. However, when the pressure oil is discharged, the piston returns to an original position by the biasing force of the spring 26.

A first pipe 36 is connected between the main vise releasing chamber 33 of the main vise operating cylinder 14 and a lever pushing chamber 35 of the spreading hydraulic cylinder 28. A second pipe 37 is branched from the first pipe 36, and a third pipe 38 is connected to a main vise closing chamber 34 of the main vise operating cylinder 14, are selectively connected to a source of hydraulic oil pressure source 40 and an oil tank 41 by a switching valve 39 between the second pipes and third 37 and 38.

The spring-assisting hydraulic cylinder 30 has a piston rod 42 for supporting the swing lever 23, and a swing lever pushing chamber 43 the spring-assisting hydraulic cylinder 30 is connected to the third pipe 38 by a fourth pipe 44. When pressure oil is supplied to the chamber 43 of the spring-assisting hydraulic cylinder 30, its piston rod 42 projects outwardly and supports the swing lever 23 in cooperation with the spring 26 at the predetermined position where the stopper 25 meets the normal rear position Q1 of the carrier vise 15.

When the switch valve 39 is shifted from a neutral position to a position b, in the above-described hydraulic control circuit, the pressure oil from the oil pressure source 40 is supplied to the main vise loosening chamber 33 of the operating cylinder 14 and the lever pushing chamber 35 of the spreading hydraulic cylinder 28, through the second pipe 37 and the first pipe 36. In this manner, the main vise operating cylinder 14 is first actuated and loosens the main vise 11 as the piston rod 29 of the spreading hydraulic cylinder 28 is pushed by the spring 26 through the end of the swing lever 23. When an oil pressure in the lever pushing chamber 35 of the spreading hydraulic cylinder 28 becomes larger than the bias of the spring 26 after the piston of the main vise operating hydraulic cylinder 14 has reached a stroke end, the spreading hydraulic cylinder 28 is next actuated and pushes the rear of the exterior end of the swing lever 23, to swing the stopper 25 of the swing lever 23 in the returning direction of the carrier vise 15 by a predetermined extent, as shown by broken lines in FIGS. 1 and 2. During this, the spring-assisting hydraulic cylinder 30 performs no pushing and supporting of the swing lever 23 because the swing lever pushing chamber 43 communicates with the oil tank 41 through the fourth pipe 44 and the third pipe 38.

Accordingly, in the cutting of the workstock W, when the carrier vise 15 is returned by the conveying hydraulic cylinder 22 while the workstock is being cut with the circular saw blade, the platform 17 of the carrier vise 15 comes into contact with the stopper 25 on the swing lever 23 and is stopped at the normal back position Q1 as shown by the solid line in FIG. 1. After the workstock is cut, when the main vise 11 has been loosened, as described above, by actuation of the main vise operating cylinder 14, and then the stopper 25 on the swing lever 23 is swung and displaced in the returning direction of the carrier vise 15 by the predetermined quantity by actuation of the spreading hydraulic cylinder 28, the carrier vise 15 retracted by a distance S corresponding to the swinging displacement of the stopper 25 to the spread position Q2 from the normal rear position Q1, so that a gap S is formed between the cut face of the workstock W and the adjoining of the circular saw blade 12.

After the carrier vise 15 has been retracted from the normal rear position Q1, as described above, to the spread Q position, it is moved forward by the conveying hydraulic cylinder 22 whereby the workstock W is forwarded by a distance of L+S as shown in FIG. 1 where L is the cut length and S is the gap. Thereafter, the switching valve 39 is shifted to a position c to connect the first pipe 36 and the second pipe 37 with the oil tank 41, and to connect the third pipe 38 with the hydraulic pressure oil source 40. The pressure oil is thus discharged from the main vise releasing chamber 33 of the main vise operating cylinder 14 and the lever pushing chamber 35 of the spreading hydraulic cylinder 28. The pressure oil is supplied to the main vise closing chamber 34 of the main vise operating cylinder 14, so that the main vise 11 is tightened and the swing lever 23 is returned by the spring 26 to its original position as shown by its solid line representation.

At that state the swing lever pushing chamber 43 of the spring-assisting hydraulic cylinder 30 communicates with the hydraulic pressure oil source 40 through the fourth pipe 44 and the third pipe 38, so that the piston rod 42 projects outwardly and supports the swing lever 23 in cooperation with the spring 26. The spring-assisting hydraulic cylinder 30 functions to assist the spring 26 to support the swing lever 23 even when the returning force of the carrier vise 15 created by the conveying hydraulic cylinder becomes unexpectedly larger than the pushing and supporting force of the swing lever 23 exerted by the spring 26. The swing lever 23 can be retained at the predetermined position by the spring assisting hydraulic cylinder 30.

In the spreading mechanism, the swing lever 23, the spring 26, the spreading hydraulic cylinder 28, the spring-assist hydraulic cylinder 30 and the restricting member 31 are arranged on a movable bed (not shown) which is fixed at a desired position along the bench 16 extending in the moving direction of the carrier vise 15. If the cut length of the workstock W is changed, the movable bed is slidably adjusted along the bench 16 according to the length to be cut.

In this embodiment of the circular saw the spreading mechanism loosens the main vise and conducts the spreading of the carrier vise through a hydraulic sequence circuit, so that two different mechanisms can be operated by a single switch valve, to provide greater control and a remarkably lower production cost.

When the spreading is conducted on the carrier vise 15 by the spreading hydraulic cylinder 28, the spring-assisting hydraulic cylinder 30 does not support the swing lever 23 because its swing lever pushing chamber 43 communicates with the oil tank 41 through the fourth pipe 44. On the other hand, the spring-assisting hydraulic cylinder 30 supports the swing lever 23 in cooperation with the spring 26 when the swing lever 23 pushing chamber 43 of the spring-assisting hydraulic cylinder 30 is in communication with the hydraulic pressure oil source 40. Therefore, the swing lever 23 is retained at the predetermined position by the spring assisting hydraulic cylinder 30. That occurs, for example, even when the returning force of the carrier vise 15 exerted by the conveying hydraulic cylinder 22, becomes unexpectedly larger than the pushing and supporting force of the swing lever 23 exerted by the spring 26.

A second embodiment of the circular saw of the present invention is shown in FIGS. 3–7. This embodiment of the circular saw has, in addition to the above-described spreading mechanism, a vibration damping mechanism for preventing vibration of the circular saw, a motion controller for controlling the motion of an ultimate stage gear of a multistage saw driving unit, thereby to prevent a backlash between the ultimate stage gear and a penultimate stage gear mating therewith when the circular saw starts to cut the workstock, and a coolant supply for selectively supplying either a misted coolant or a liquid coolant to the saw teeth and the workstock.

A high speed steel saw blade and a cemented-on carbide-tipped saw blade are most suitably employed in the circular saw of the present invention. In most cases, the high speed steel saw blade is operated at a cutting speed of from about 12 to about 40 meters per minute, whereas the cemented-on carbide-tipped saw blade is operated at the higher cutting speed of from about 80 to about 120 meters per minute. In case of the high speed steel saw blade the cutting speed is generally considerably slower than in the case of cemented-on carbide-tipped saw blade, so that even if it vibrates slightly during cutting, the cutting accuracy is hardly reduced by the vibration. On the other hand, in case of the cemented-on carbide-tipped saw blade the cutting speed is very high, about 100 meter per minute at the average, so that the vibration of the saw blade occurs more frequently, and hence there is a need to provide a means for preventing the vibration of the saw blade. Severe vibration and impact occurs in the saw blade in a circular saw using the cemented-on carbide-tipped saw blade, when it starts to cut the workstock, because a backlash between an ultimate stage gear of a saw driving unit and a penultimate stage gear mating therewith exerts a severe reaction on the saw blade. Therefore, the circular saw using the cemented-on carbide-tipped saw blade requires vibration damping to prevent the backlash at the time of starting the cut. Suitably a liquid coolant is used in the saw using the high speed steel saw blade. However, a misting coolant is suitably used in the circular saw using the cemented-on carbide-tipped saw blade, because the use of the liquid coolant cools the carbide tipped teeth heated by heat generated during cutting, and is likely to damage the carbide tipped saw teeth.

Two different kinds of circular saws were required in the prior art, since the high speed steel saw blade can be mounted on any type of saw, whereas the cemented-on carbide-tipped saw blade can be suitably mounted only on a certain type of saw. That is, the conventional circular saw that is for exclusive use with the high speed steel saw blade did require any vibration damping and to prevent backlash and has a liquid coolant supply suited only for the high speed steel saw blade. In contrast, the saw used with a cemented-on carbide-tipped saw blade is equipped with the vibration damper and means for preventing backlash and provisions for the misting coolant. Thus, in the prior art one must use either the one or the other kind of saw, with the attendant high cost providing different machines.

The novel circular saw of this embodiment of the present invention shown in FIGS. 3–7 presents a solution of the above-described problem, and can use both the high-speed steel saw blade and the cemented-on carbide-tipped saw blade in the same saw. This saw is described hereinafter in detail, but elements and portions corresponding to those of the above-described circular saw shown in FIGS. 1 and 2 are designated by the same numerals with the detailed description thereof being omitted.

Figure 3:
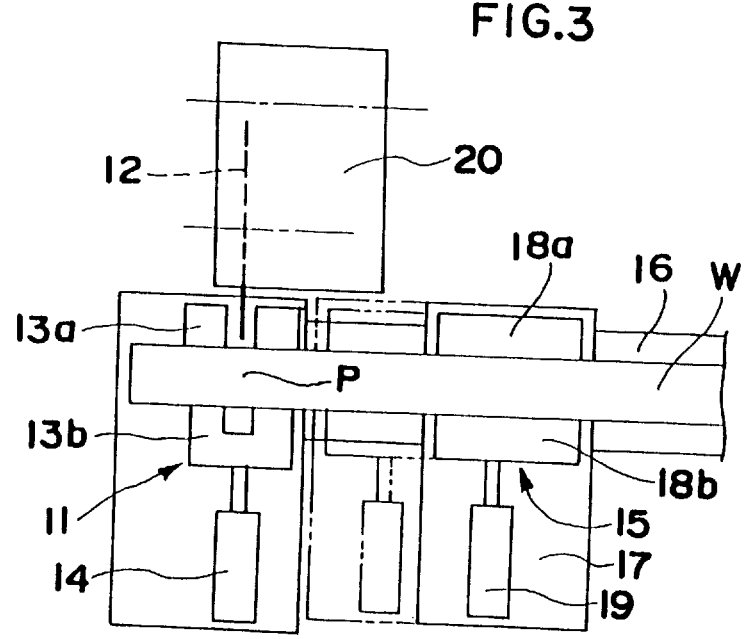
FIG. 3 is a plan view of another embodiment of a circular saw of the present invention.
Figure 4:
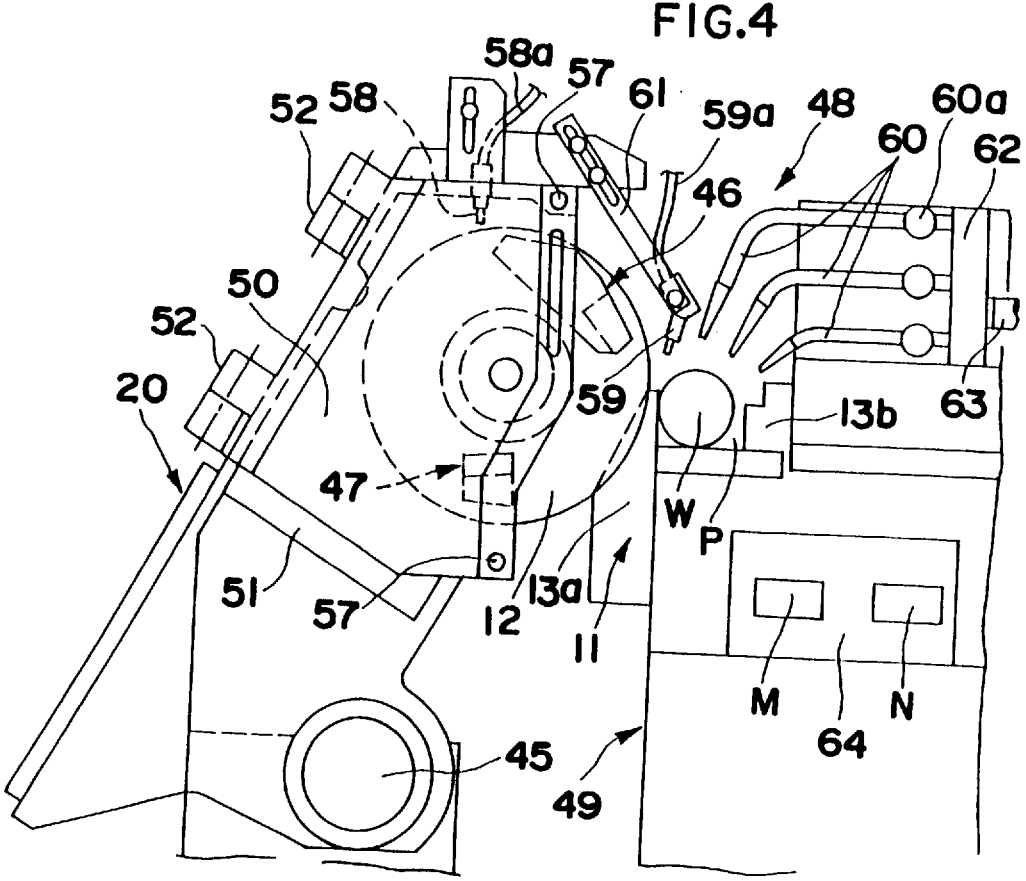
FIG. 4 is a side view of the circular saw shown in FIG. 3, with a closed cover plate of the saw frame.

FIG. 3 schematically shows a saw having a substantially similar structure as the saw embodiment shown in FIG. 1, with the spreading mechanism omitted for simplicity of description. A circular saw blade 12 is supported from a swing type saw frame 20 as shown in FIG. 4. The saw frame 20 is swingably supported on a support shaft 45 so that the circular saw 12 blade mounted on a free part of the frame can be moved nearer to and away from a workstock W held by a main vise 11.

Figure 5:
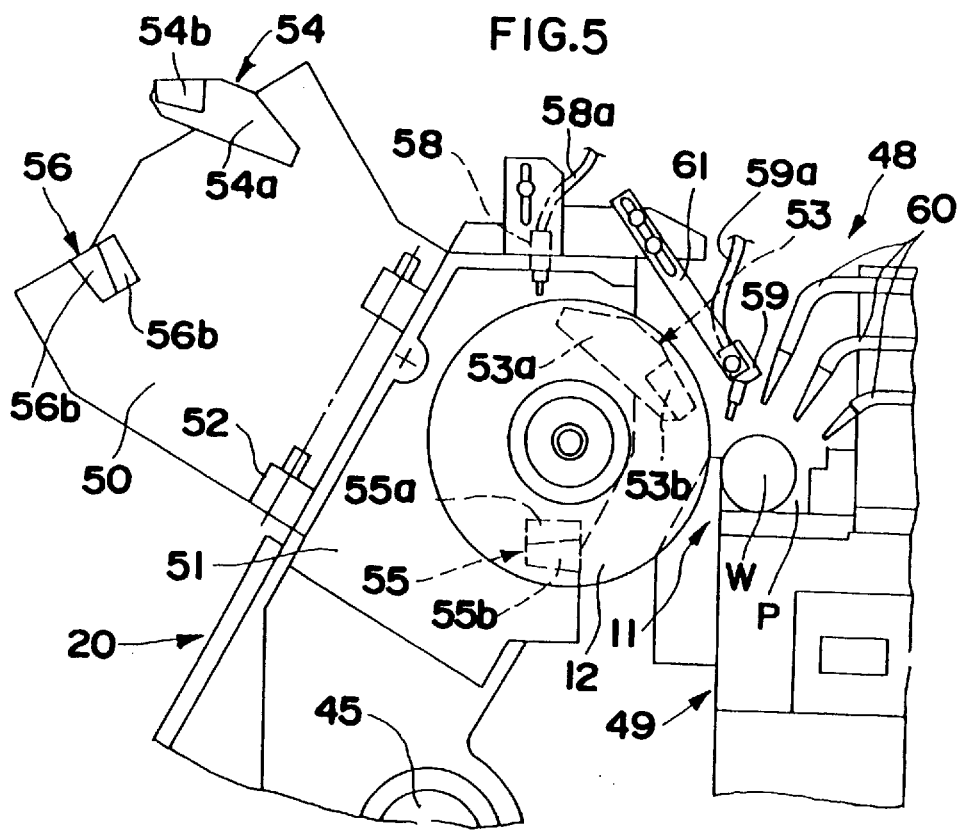
FIG. 5 is a side view of the circular saw of FIG. 4, with the cover plate open.

As shown in FIGS. 4 and 5, vibration damper components 46, 47 are provided on the saw frame 20, coolant supply means 48 is provided on the saw frame 20 and on a base 49 of the main vise 11. A releasable cover plate 50 faces a frame 51 as shown in FIG. 4, with the circular saw blade 12 interposed between them. Hinges 52 connect the cover plate 50 to the frame 51 and permit an outward swinging opening of the cover plate as shown in FIG. 5.

Figure 6:
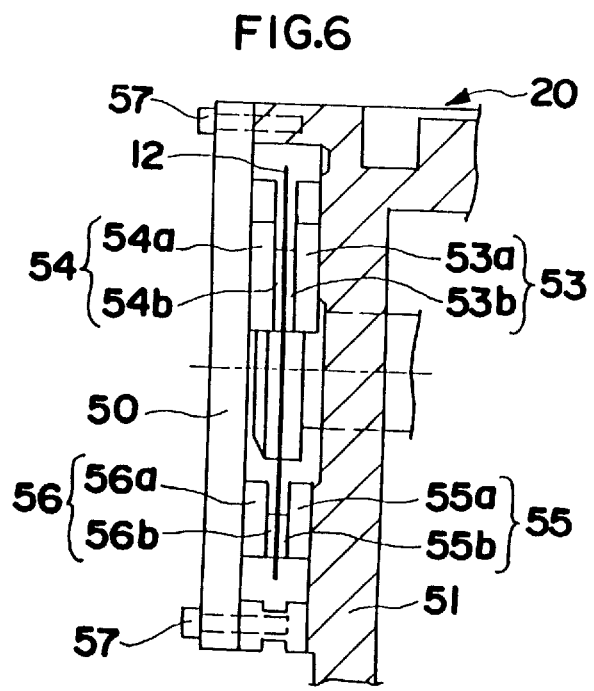
FIG. 6 is a longitudinal cross-sectional view of vibration damper for the circular saw.

The vibration damper component 46 has vibration damping blocks 53, 54, as best shown in FIG. 6, at both sides of the outer periphery of the saw blade that is disposed between them. The other vibration damping component 47 also has vibration damping blocks 55, 56 arranged at both sides of the outer periphery of the circular saw blade 12 at a position that is circumferentially remote from the vibration damper component 46. Both the vibration dampers 46, 47, and the vibration damping blocks 53, 55 at one side of the circular saw blade 12 are mounted, as shown in FIGS. 5 and 6, on the frame 51 of the saw frame 20, whereas the vibration damping blocks 54, 56 at the other side of the blade 12 are mounted on the releasable cover plate 50. As best shown in FIG. 6, the vibration damping blocks 53, 54, 55, and 56 each include support plates 53a, 54a, 55a and 56a, and buffers 53b, 54b, 55b and 56b secured to the inward sides of the respective damper block support plates. In performing their vibration damping operation buffers 53b, 54b, 55b and 56b are arranged with a narrow gap between them and the adjacent surface of the circular saw blade 12. Bolts 57 are used for tightening the closed cover plate 50 to the frame body 51.

The provision of the vibration dampers 46, 47 on the saw frame 20 enables restraining saw blade 12 vibration occurring during a high speed of saw blade rotation, such as when the cemented-on carbide-tipped circular saw blade is used. Also even in the case where the high speed steel saw blade is used as the circular saw blade 12 the vibration damping component 46, 47 damp vibration of the saw blade 12 that may occur especially in the case of larger diameter or thicker saw blades, particularly when the saw blade is thin, but has a large diameter.

As best shown in FIGS. 4 and 5 a coolant supply 48 has a plurality of misting nozzles 58, 59 for supplying a coolant mist to the circular saw blade 12 and the workstock W, and the plurality of liquid coolant nozzles 60 for supplying a liquid coolant. The misting nozzles 58, 59 and the liquid nozzles 60 can be selectively used. One of the misting nozzles 58 is mounted from the top of the frame 51 of the saw frame 20 pointing to the periphery of the circular saw blade 12, whereas the other misting nozzle 59 is mounted from a free end of an attaching arm 61, adjustably secured to the frame 51, and pointing toward the cutting portion P of the workstock. Each of the misting nozzles 58, 59 is connected to a coolant mist supply source (not shown) through coolant mist supply pipes 58a, 59a. The liquid coolant nozzles 60 each have a shutoff valve 60a, and are oriented toward the cutting portion P of the workstock and are connected to liquid coolant distributor 62 on the base 49 of the main vise 11. The liquid coolant distributor 62 is further connected to a liquid coolant supply source (not shown) through a liquid coolant supply pipe 63.

The coolant mist supply pipes 58a, 59a have a midway control valve (not shown) and the liquid coolant supply pipe 63 is in communication with the liquid coolant supply source. As shown in FIG. 4, operating switches M, N are provided, on a control panel 64 attached to the base 49 for the selective use of either the misting nozzles 58, 59 or the liquid nozzles 60. The switch M on a control panel 64 is an actuator switch for the mist coolant, and the switch N is an actuator switch for the liquid coolant. Accordingly, when the cemented-on carbide-tipped saw blade is used, actuation of the switch M enables the misting nozzles 58, 59 to supply only the misting coolant to the circular saw blade 12 and to the cutting portion P of the workstock W. On the other hand, when the high speed steel saw blade is to be used, actuation of the switch N enables the liquid nozzles 60 to supply only the liquid coolant to the circular saw blade 12 and to the cutting portion P of the workstock W.

Figure 7:
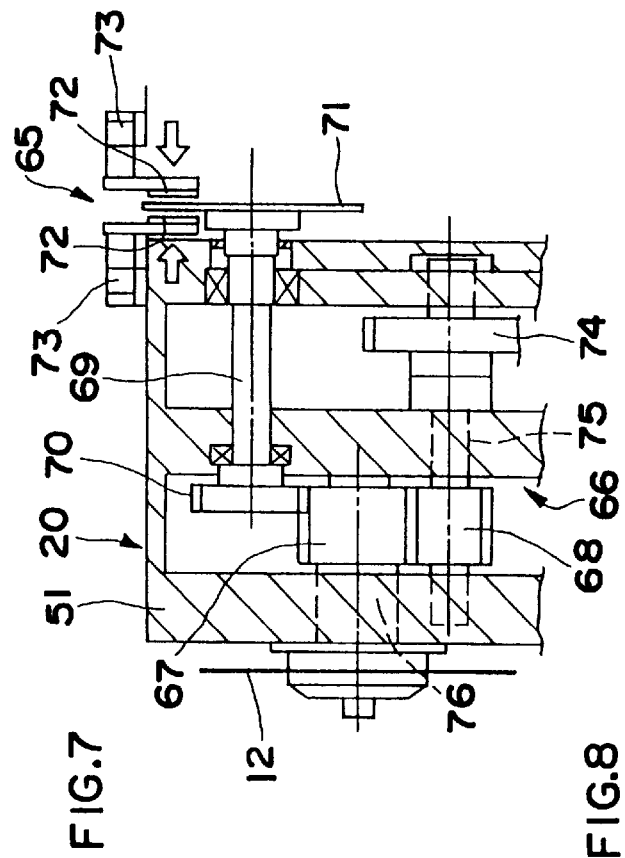
FIG. 7 is a longitudinal cross-sectional view showing a motion controller.

FIG. 7 shows a motion controller 65 for preventing a backlash. The motion controller controls the motion of an ultimate stage gear 67 of a multistage saw driving unit 66 and thereby prevents a backlash between the ultimate stage gear 67 and a penultimate stage gear 68 mating with each other when the circular saw blade starts to cut the workstock W. The motion controller 65 includes a brake gear 70 attached to one end of a brake shaft 69 supported from the frame body 51 of the saw frame 20, to mate with the ultimate stage gear 67 of the multistage saw driving unit 66, a brake disc 71 attached from the other end of the brake shaft 69. A pair of braking pads 72, 72 are arranged facing each other with the brake disc 71 between them. A brake-operating cylinder 73 is adapted to drive the braking pads 72, 72 against the sides of the brake disc 71 for pressing against peripheral portions of the brake disc. During the rotation of the circular saw blade 12 by the multistage saw driving unit 66, the brake shaft 69 is rotated by the brake gear 70 mating with the ultimate stage gear 67, in which an actuation of the brake-operating cylinder 73 moves the braking pads 72, 72 into contact with the brake disc 71 so that a braking force is exerted on the brake shaft 69 and thus the movement of the penultimate stage gear 68 is controlled through the ultimate stage gear 67. The saw driving unit 66 has a motor (not shown), a gear 74 rotated by the motor, an intermediate transmission shaft 75 integrated coaxially with the gear 74, and a gear 68 (a penultimate stage side gear) fixed on the intermediate shaft 75. The ultimate stage gear 67 meshes with the penultimate stage gear 68, and the ultimate stage gear 67 is formed integrally with a motor driven shaft 76.

The motion controller 65 is actuated when the circular saw blade 12 rotated by the multistage saw driving unit 66 approaches the cutting portion P of the workstock W by swinging the saw frame 20. In that case movement of the penultimate stage gear 68 is controlled through the ultimate stage gear 67, so that a backlash is prevented between both gears 67, 68. Thus there is no likelihood of vibration and impact in the circular saw blade 12 when it cuts into and through the workstock W. When the cemented-on carbide-tipped saw blade is used as the circular saw blade 12 and it is rotated at a high speed, effective motion control is prevented by the motion controller 65.

When the cemented-on carbide-tipped saw is used as the circular saw blade 12, vibration of the circular saw blade during its high speed of rotation can be restrained by the vibration damping components 46, 47. Furthermore, backlash is prevented with the motion controller 65, between the ultimate stage gear and the penultimate stage gear meshing with each other when the circular saw blade starts to cut the workstock, so that vibration, shock and noise can be restrained. Furthermore, where the cemented-on carbide-tipped saw is used as the circular saw blade 12, the mist coolant can be supplied for the selective use of the misting nozzles 58, 59, and when the high speed steel saw is used as the circular saw blade 12, the liquid coolant can be supplied by the selective use of the liquid nozzles 60. Therefore, there is no need to provide of two different kinds of circular saws i.e. the circular saw for use of the high speed steel saw blade and the circular saw for use of the cemented-on carbide-tipped saw. Thus, the high-speed steel saw blade and the cemented-on carbide-tipped saw blade can both be used in a simple saw resulting in great simplification of operation and cost reduction.

Figure 8:
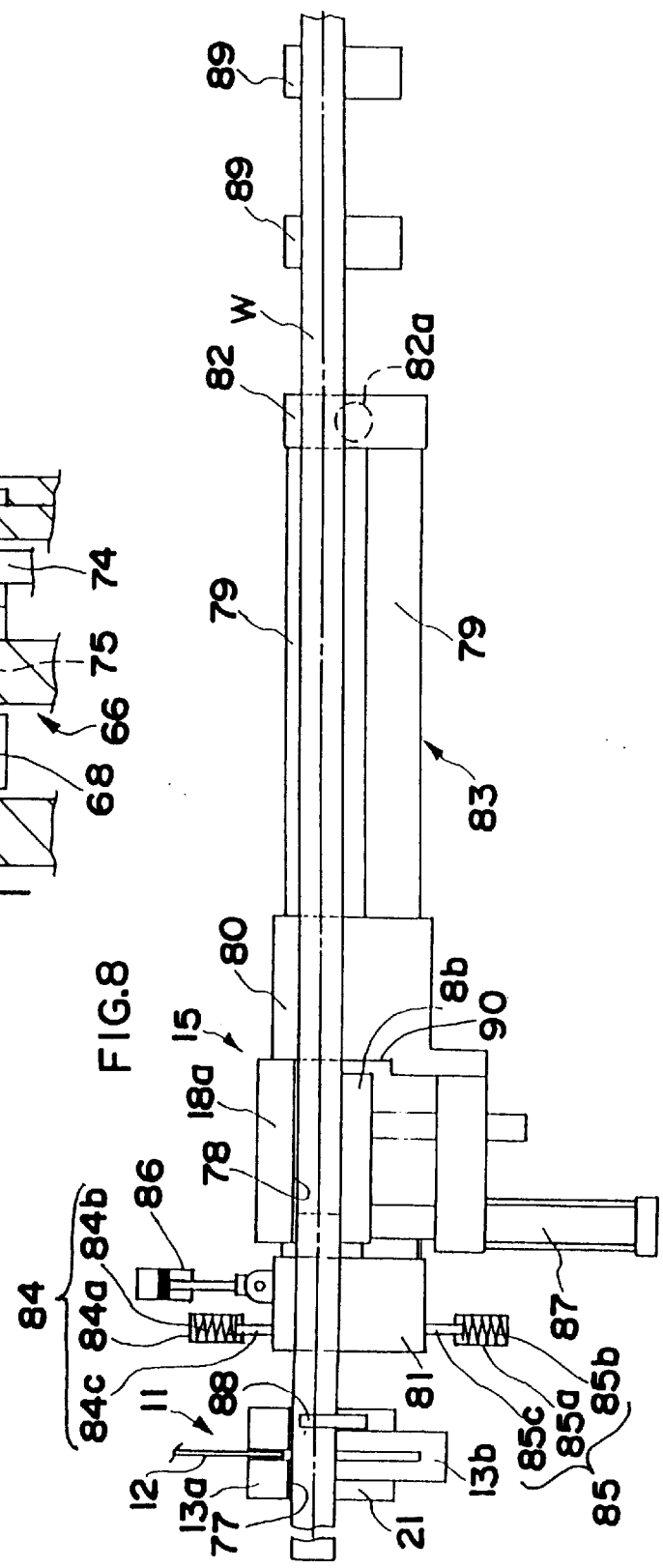
FIG. 8 is a plan view of yet another embodiment of a circular saw according to the present invention, showing a guide frame in a neutral position.
Figure 11:
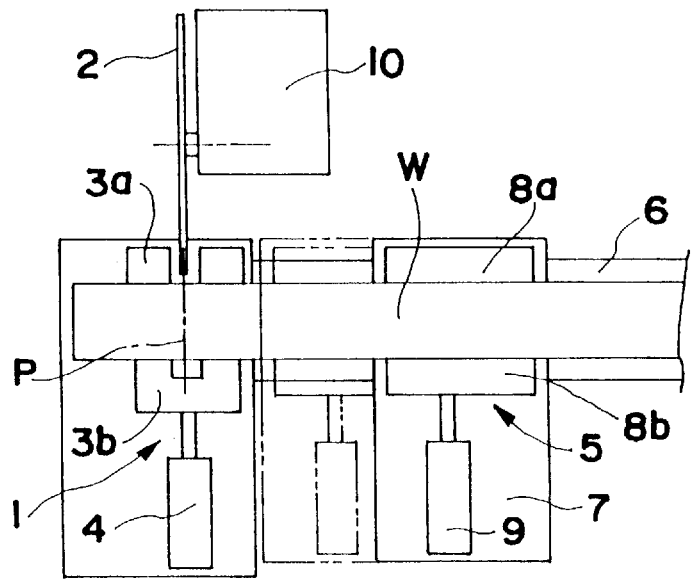
FIG. 11 is a plan view of circular saw machine of the prior art.
Figure 12A:
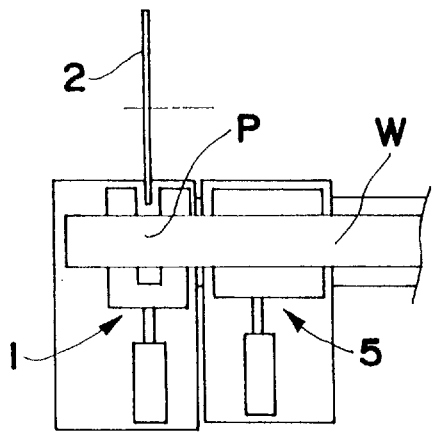
FIGS. 12(A)–(D) are explanatory views for the cutting and spreading operations of the prior art circular saws.
Figure 12B:
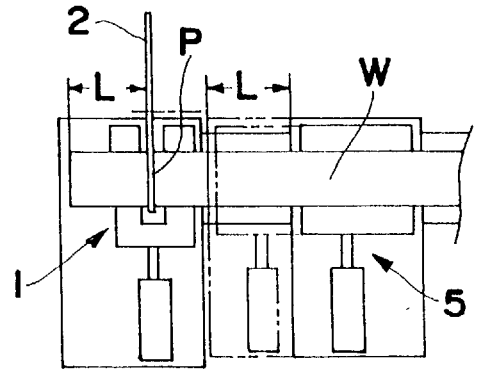
Figure 12C:
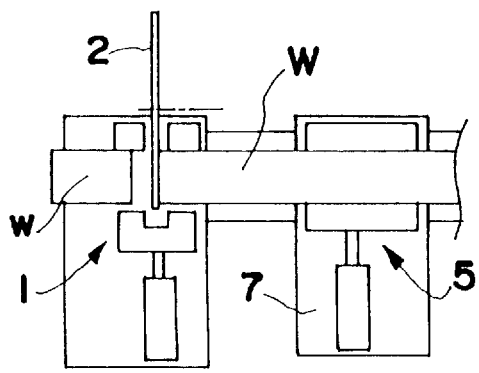
Figure 12D:
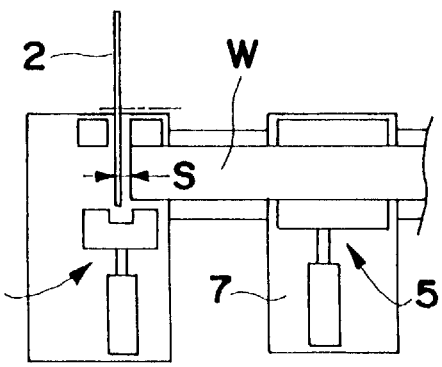

FIGS. 8 to 10 show the third embodiment of a circular saw according to the present invention, which is designed to avoid any damage to the workstock by keeping it from contacting a side reference face of the main vise or the carrier vise when the carrier vise is moved forward from a rear position to a front position while holding and advancing the workstock, or when the carrier vise in the front position released a cut part of the workstock while the remaining workstock is held in the main vise, is returned to the rear position.

For reference purposes, as an example of a conventional circular saw the embodiment shown in FIGS. 14–20 is described. A main vise 11 is disposed at a cutting path of a circular saw blade 12, and further to the rear a carrier vise 15 is provided for advancing a workstock W feed on supporting rollers 89 from the workstock feed direction by a predetermined distance so that an advanced part of the workstock can be cut with the saw, which carrier vise moves backward and forward by a predetermined stroke length.

Figure 19:
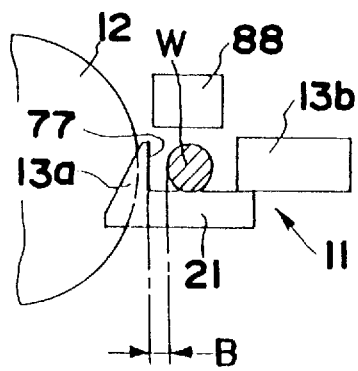
FIG. 19 is a cross-sectional view of the prior art saw taken along the line 19—19 of FIG. 14.
Figure 20:
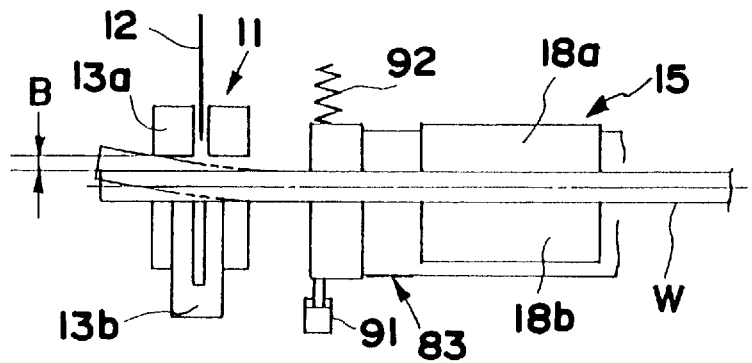
FIG. 20 is an explanatory view of a saw of the prior art and showing a bending of a part of the workstock.

As shown more clearly in FIG. 19, the main vise 11 has a fixed vise jaw 13a formed integrally with a base 21 for supporting the workstock W and has a reference side face 77 for supporting a side of the workstock W, a movable vise jaw 13b movable laterally toward and away from the fixed vise jaw 13a, and a movable vise jaw 88 vertically movable in reference to an upper surface of the base 21. The carrier-combined vise 15 has a configuration similar to the main vise 11 and has a base 90 for supporting the workstock W, a fixed vise jaw 18a integrally formed with the base 90 and having a reference side 78 for supporting the side of the workstock W, a movable vise jaw 18b laterally movable toward and away from the fixed vise jaw 18a, and a vise operating cylinder 87 associated with the movable vise jaw 18b. The carrier-combined vise 15 is mounted on a sliding platform 80 which can slide along a pair of parallel guide rails 79, 79 extending in the moving direction of the workstock W, the slide platform 80 being associated with driving means such as ball screws.

The guide rails 79, 79 forms a guide frame 83 together with a pair of front and rear blocks 81, 82 at the ends of the guide rails 79, 79. The guide frame 83 is pivotably supported on a floor support 93 with a vertical pivot 82a projecting downwardly from the middle of the bottom of the rear block 82, and being horizontally swingable about the vertical pivot 82a. This means that the carrier vise 15 can also be horizontally swung about the vertical pivot 82a as the guide frame swings. A laterally actuating cylinder 91 and a laterally pushing spring 92 are arranged on an open end of the guide frame 83, opposed to both sides of the front block 81. The guide frame 83 is displaced in the direction of the arrow shown in FIG. 16 about the vertical pivot 82a when the laterally actuating cylinder 91 is retracted inwardly and the laterally actuating cylinder 91 is projected outwardly against the bias of the laterally pushing spring 92, or is displaced in a direction of the arrow in FIG. 17 by the bias or pushing force of the spring 92.

The cutting operation of this saw of the workstock is achieved as follows. FIGS. 14 and 15 show a condition of the saw where the cutting by the circular saw blade 12 begins while the main vise 11 holds the workstock W tight and the carrier vise 15 in its front position also holds the workstock W tight. At that point, the guide frame 83 is located at a neutral position where the workstock W is in contact with the side faces 77, 78 and the reference side face of the main vise 11 and the carrier vise 15. When the cutting off is finished as shown in FIG. 16, the main vise 11 holds the remaining part of the workstock W, and the carrier vise 15 retracts to a rear position as shown by a broken line after its own movable vise jaw 18b was loosened from the workstock W. Before the carrier vise 15 is returned, the guide frame 83 is displaced in the direction of the arrow about the vertical pivot 82a by an outward actuation of the laterally actuating cylinder 91, and the carrier vise 15 is moved laterally so that a gap is formed between the reference side face 78 of the fixed vise jaw 18a, of the carrier vise 15 and the side of the workstock W (a relatively wide gap A1 being formed near the front position, and a relatively narrow gap A2 being formed near the rear position). Accordingly, when the carrier vise 15 is returned from its front position shown by the solid line in FIG. 16, toward its rear position shown by the broken line, the carrier vise 15 will not damage the workstock W because its own reference side face 78 does not come into sliding contact with the workstock W.

Figure 17:
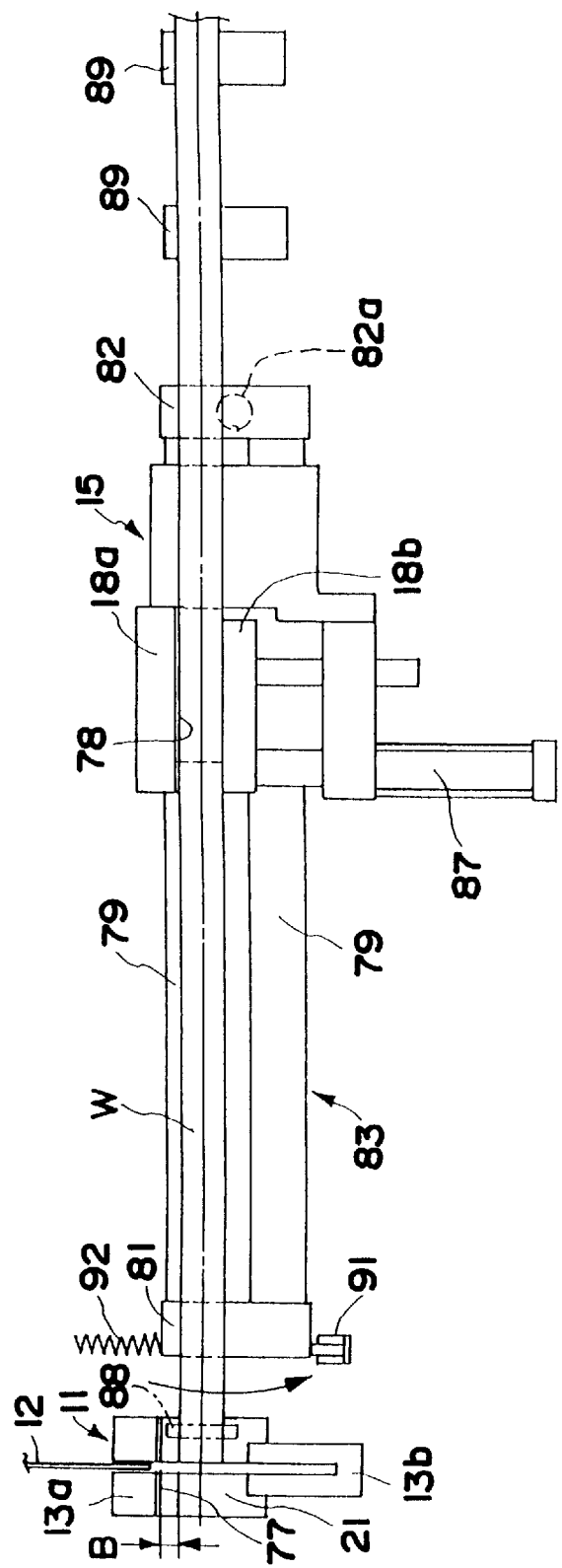
FIG. 17 is a plan view of the prior art saw of FIG. 14.
Figure 18:
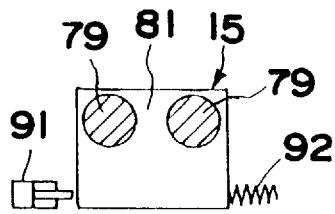
FIG. 18 is a cross-sectional view of the prior art saw taken along the line 18—18 of FIG. 14.

Next, the carrier vise 15, which was returned to the rear position as shown in FIG. 17, is moved forward to its front position while the workstock W is sandwiched between and held tightly by the fixed vise jaw 18a and the movable vise jaw 18b, whereas the main vise 11 is loosened from the workstock W. On moving the carrier vise 15 forward by a predetermined stroke while holding the workstock W, the guide frame 83 is pushed by the bias of the spring 92 on the opposite side of the cylinder 91 which is loosened and is displaced in the direction of the arrow shown in FIG. 17 about the vertical pivot 82a, and the carrier vise 15 holding the workstock W is swung in the same direction together with the workstock W, so that a gap B is formed between the side 77 of the fixed vise jaw 13a of the main vise 11 and the side of the workstock W to be forwarded, as shown in FIGS. 17 and 19. Accordingly, when the carrier vise 15 is moved forward from its rear position as shown in FIG. 17 to its front position for cutting the workstock, the advanced workstock W is prevented from contacting the side face 77 of the main vise 11 to avoid it causing any damage.

As the carrier vise 15 is in the front position and the side of the forwarded workstock W has the gap B between it and the side state 77 of the main vise 11 (see FIG. 19), the main vise 11 is tightened to grab the advanced workstock W while the workstock W is held in the carrier vise 15 of the guide frame 83, wherein such tightening operation (particularly, due to a pressure of the movable vise jaw 13b of the main vise 11 toward the forwarded workstock W) moves the unrestrained end of the guide frame 83 to the side face 77 by the workstock W. However, when the workstock W is of a relatively small diameter, there is a likelihood that the workstock advanced to the main vise 11 becomes bent, as shown by a broken line in FIG. 20, from a position in which the carrier vise 15 holds the workstock W, so that the side of the forwarded workstock is damaged due to collision with the fixed vise jaw 13a.

When the guide frame 83 is moved to the side face 77 by the tightening of the main vise 11 toward the forwarded workstock W, the guide frame 83 is subjected to the opposite operation by the pushing force of the laterally pushing spring 92 acting on the unrestrained end of the guide frame 83, so that the lateral movement of the workstock W to the side face 77 meets the opposite force from the laterally pushing spring 92 in a position where the carrier vise 15 holds the workstock W. Due to that opposite force from the laterally pushing spring 92 and the pressure from the movable vise jaw 13b against the workstock W, it is deformed into an arch to the end, as shown by a broken line in FIG. 20, so that the side of the forwarded workstock is damaged due to collision with the fixed vise jaw 13a.

Accordingly, as is described hereinafter, the saw of the present invention, as shown in FIGS. 8–10 provides a solution to the above-described problem. Elements and machine parts corresponding to those of the known saw shown in FIGS. 14 through 20 are designated by the same numerals with the description of such common elements being abbreviated or omitted.

As shown in FIGS. 8–10 a pair of springs 84, 85 are located at both sides of the front block 81 of the exposed end of the guide frame 83 which is horizontally swingable about the vertical pivot 82a. The springs 84, 85 are located at opposed positions on the sides, of the front block 81 for supporting the guide frame 83 at a neutral position (FIG. 8) where the workstock W is in contact with the side face 77 and 78 the reference side face respectively of the main vise 11 and the carrier vise 15. An actuating cylinder 86 is located at the side of one spring 84 of the front block 81 of the guide frame 83 for laterally displacing the end of the guide frame 83.

The actuating cylinder 86 is an air cylinder for swinging the guide frame 83 laterally about the vertical pivot 82a against the bias of spring 84 or 85 by laterally pushing or pulling the free end of the guide frame 83 so that it can be displaced from its neutral position, either to a first displacement position where the reference side face 78 of the carrier vise 15 loosens from the workstock W, or to a second displacement position where the workstock W becomes removed from the side face 77 of the main vise 11.

The springs 84, 85 each have a cylindrical casing 84a, 85a, a coiled spring 84b, 85b each confined within a casing 84a, 85a, and a thrust rod 84c, 85c connected to the coil springs 84b, 85b to exert a thrust on the front block 81 of the guide frame 83. In this manner, when the guide frame 83 is located at the first displacement position, as shown in FIG. 9, where the reference side face 78 of the carrier vise 15 loosens the gripped workstock W, the spring 84 on one side toward which the guide frame is displaced is compressed by pulling of the actuating cylinder 86, while the spring 85 on the opposite side is idle relative to the guide frame 83. Similarly, at the second displacement position of the guide frame 83, as shown in FIG. 10, where the workstock W is loosened in the side face 77 of the main vise 11, the spring 85 on the opposite side toward which the guide frame 83 is displaced is compressed by the pushing action of the actuating cylinder 86, while the spring 84 on one side from which the guide frame 83 moves away is idle relative to the guide frame 83.

The cutting operation by this saw of the workstock is achieved as follows. FIG. 8 shows the saw when the cutting by the circular saw blade 12 begins while the main vise 11 holds the workstock W tight and the carrier vise 15 in the front position also holds the workstock W tight. In that state, the guide frame 83 is supported by the springs 84, 85 on both the sides and maintained at a neutral position where the workstock W is in contact with the side face 77, and the reference side face 78 of the main vise 11 and the carrier vise 15. The actuating cylinder 86 is inactive while a piston is stopped midway.

When the cutting off is finished as shown in FIG. 9, the main vise 11 keeps on holding a remaining part of the workstock W, and the carrier vise 15 is returned to a rear position as shown by a broken line after its own movable vise jaw 18b has been loosened from the workstock W. Before the carrier vise 15 is returned, the guide frame 83 is sideways displaced in the direction of the arrow about the vertical pivot 82a from the neutral position to the first displacement position by the retracting motion of the actuating cylinder 91. At the same time the carrier vise 15 moves sideways relative to the advancing path of the workstock, so that a gap is formed between the reference side face 78 of the fixed vise jaw 18a of the carrier vise 15 and the side face of the workstock W with a relatively wide gap A1 being formed near the front and a relatively narrow gap A2 being formed near the rear of the carrier vise 15. In this manner, the spring 84, on one side toward which the guide frame is displaced from its neutral position, is compressed by a pulling action of the actuating cylinder 86, while the spring 85 on the opposite side is idle relative to the guide frame 83. Accordingly, when the carrier vise 15 at the first displacement position of the guide rail 83 is returned from its foremost position shown by the solid line in FIG. 16, toward the rear position shown by the broken line, the carrier vise 15 will not damage the workstock W because its own reference side face 78 is not in sliding contact with the workstock W.

The carrier vise 15, which was returned to its rear position as shown in FIG. 10, is moved forwardly to the foremost position while the workstock W is held between the fixed vise jaw 18a and the movable vise jaw 18b, and the main vise 11 loosened over the workstock W. On moving forward the carrier vise 15 by a predetermined stroke while it holds the workstock W, the guide frame 83 is thrust laterally by the actuating cylinder 86, and is displaced in the direction of the arrow shown in FIG. 10 about the vertical pivot 82a from the first displacement position to the second position. The carrier vise 15 holding the workstock W is swung in the same direction together with the workstock W, so that a gap B is formed between the side face 77 of the fixed vise jaw 13a of the main vise 11 and the side of the workstock W to be advanced. This compresses the spring 85, on the opposite side toward which the guide frame 83 is displaced from the first displacement position, by the pushing of the actuating cylinder 86, while the spring 84 on one side from which the guide frame 83 goes away is idle relative to the guide frame 83. Accordingly, when the carrier vise 15 at the second displacement position of the guide frame 83 is moved forward from its rear position in FIG. 17 to the front position for cutting the workstock, the advanced workstock W is prevented from contacting the side face 77 of the main vise 11 to avoid suffering damage therefrom.

While the workstock W held in the carrier vise 15 is advanced to the front position, the main vise 11 is closely tightened to press against the advanced workstock W prior to cutting. The tightening of the main vise 11 moves the free end of the guide frame 83 laterally from the second displacement position to the neutral position by way of the workstock W, of the movable vise jaw 13b of the main vise 11 toward the advanced workstock W, due to pressure. The spring 84 on the side of the actuating cylinder 86 is in an idle position relative to the guide frame 83, and the actuating cylinder 86. Therefore, the guide frame 83 is laterally moved without being subjected to an opposite force from the spring 84 and the actuating cylinder 86 in a position where the carrier vise 15 holds the workstock W. As a result of this, in a situation where the workstock W is of a relatively small diameter, there is no likelihood as in the conventional circular saw that the workstock advanced to the main vise 11 is laterally bent, laterally from a position in which the carrier vise 15 holds the workstock W, so that the side face of the forwarded workstock is not damaged due to collision with the fixed vise jaw 13a.

A spring action can be exerted in the circular saw on the guide frame 83, since the springs 84, 85 have cylindrical casings 84a, 85a, the coil springs 84b, 85b inserted into the casings 84a, 85a and contact pieces 84c, 85c are connected to the coil springs 84b, 85b and contact the free end of the guide frame 83. Complicated piping is not necessary since the cylinder 23 has an air cylinder, rather than a liquid-actuated hydraulic cylinder and the action of the guide frame 83 as well as switching the cylinder to a neutral position can be performed rapidly and the impact on the stroke end of the cylinder can be relaxed by a cushioning action characteristics of air cylinders.

In the above-described circular saw, the spring operation can be advantageously conducted on the guide frame 83 by the arrangement in which the springs 84,85 each comprises a cylindrical casing 84a, 85a and a thrust rod 84c, 85c connected to the coil springs 84b, 85b thus to exert a thrust on the front block 81 of the guide frame 83.

I claim:

1. A circular saw device, comprising:
   (a) a circular saw blade for crosscutting workstock along a crosscutting path to form, after a crosscut, front and rear cut faces opposed to each other;
   (b) a main vise for selectively holding said workstock in front of and behind the crosscutting path, and having a main vise operating cylinder, said main vise operating cylinder having a piston for dividing the cylinder into a main vise loosening side and a main vise tightening side;
   (c) a carrier vise for selectively holding said workstock, and for advancing workstock forward by one cutoff length over said crosscutting path, when the workstock is held in said carrier vise, and the carrier vise having a front position for transferring to the main vise one cutoff length of the workstock over the crosscutting path, and a normal rear position for preparation of a next feeding of the workstock;
   (d) a spreading mechanism for forming a gap between said cutoff face of the workstock and an adjacent side of said saw blade by effecting rearward withdrawal of said carrier vise holding the workstock from the normal rear position somewhat further rearward to a rearmost position, said spreading mechanism having:
     (i) an elongated swing lever pivotally connected to a fixed position on the circular saw device;
     (ii) a stopper means located on said swing lever for defining the normal rear position of the carrier vise;
     (iii) a spring for biasing said swing lever into a normal rest position;
     (iv) a spreading cylinder adapted to effect the movement of said carrier vise from the normal rear position to the rearmost position by a rearward moving of said stopper, said spreading cylinder having a piston intermediate a first side facing said swing lever and a rear pressurizing side;
   (e) a source of hydraulic operating pressure;
   (f) a first conduit connected between said main vise loosening side of said main vise operating cylinder and said source of hydraulic pressure;
   (g) said rear pressurizing side of said spreading cylinder being in fluid connection with said main vise loosening side of said main vise;
   (h) a second conduit having one end connected to said main vise tightening side of said main vise operating cylinder and a second end connected to said source of hydraulic pressure;
   (i) means for alternately applying said hydraulic operating pressure to said first and second conduits;
   (j) whereby, due to said fluid communication therebetween, said pressurizing side of said spreading cylinder and said main vise loosening side of said main vise are pressurized simultaneously, however, due to resistance supplied by said spring, said spreading cylinder moves said swing arm a short period of time after loosening activation of said main vise, thereby ensuring that said main vise is detached from the workstock before withdrawal of said carrier vise to said rearmost position.

2. The circular saw device of claim 1, said spreading mechanism further comprising a spring-assisting hydraulic cylinder having a piston dividing said spring-assisting hydraulic cylinder into two sides, one of said two sides being connected to said forward side of said swing lever adjacent to said spring for retaining said stopper, cooperatively with said spring, at a position when said spreading cylinder is inactive, and an opposite side of said spring-assisting hydraulic cylinder being connected to said second conduit.

3. The circular saw device of claim 1 further comprising a conveying hydraulic cylinder for moving said carrier vise to its front position and to its normal position.

4. A circular saw device according to claim 1, wherein:
   (a) said swing lever comprises first and second ends each with forward and rearward faces;
   (b) said stopper means is located on the forward face of said first end of said swing lever;
   (c) said spring is connected to the forward face on said second end of said swing lever;
   (d) said spreading cylinder is connected to the rearward face of said second end of said swing lever, opposite said spring; and
   (e) said swing lever arm is pivotally connected to said circular saw device intermediate said stopper and said spreading cylinder.

5. A circular saw device according to claim 1, wherein said means for alternately applying said hydraulic force to said first and second conduits comprises a valve.

6. The circular saw device of claim 1, comprising:
   (a) anti-vibration means including a pair of anti-vibration blocks arranged to both lateral sides of the circular saw so as to face one another with the circular saw interposed therebetween;
   (b) motion controlling means, for prevention of a backlash, which is adapted to control a motion of an alternate stage gear of a multi-stage saw driving unit and thereby prevent a backlash likely to occur between the ultimate stage gear and a penultimate stage gear mating therewith when the circular saw starts to cut the workstock;
   (c) the coolant supply means including one or more mist nozzles for supplying a misty coolant to the circular saw and the workstock, and one or more fluid nozzles for supplying a fluid coolant, said coolant supply means being adapted to selectively use either the mist nozzles or the fluid nozzles.

* * * * *